United States Patent [19]
Nguyen et al.

[11] Patent Number: 5,915,000
[45] Date of Patent: Jun. 22, 1999

[54] TEXT TELETYPE WRITER WITH CALLER IDENTIFICATION FUNCTION

[76] Inventors: Vinh H. Nguyen, 5484 Dunson Dr., Haltom, Tex. 76148; Sidney Ander, 4301 Rowan Dr., Fort Worth, Tex. 76116; Bryan Davis, 1110 Quailrun, Azle, Tex. 76020; Kevin L. Hale, 225 Woodhaven, Desoto, Tex. 75115

[21] Appl. No.: 08/885,303

[22] Filed: Jun. 30, 1997

[51] Int. Cl.⁶ .................................................. H04M 11/00
[52] U.S. Cl. .............................................. 379/52; 379/142
[58] Field of Search .......................... 379/52, 142, 110.01, 379/387, 354–357, 93.08, 93.09, 93.17, 93.18, 93.23, 93.37

[56] References Cited

U.S. PATENT DOCUMENTS

| | | | |
|---|---|---|---|
| 5,228,073 | 7/1993 | Smith | 379/57 |
| 5,303,301 | 4/1994 | Takahata | 379/142 |
| 5,325,417 | 6/1994 | Engelke et al. | 379/52 |
| 5,467,385 | 11/1995 | Reuben et al. | 379/88 |
| 5,524,140 | 6/1996 | Klausner et al. | 379/67 |
| 5,546,447 | 8/1996 | Skarbo et al. | 379/142 |
| 5,604,786 | 2/1997 | Engelke et al. | 379/52 |
| 5,699,417 | 12/1997 | Khojasteh | 379/142 |

*Primary Examiner*—Wing F. Chan
*Attorney, Agent, or Firm*—Melvin A. Hunn

[57] ABSTRACT

A text teletype writer (TTY) is provided for receiving, processing, and displaying caller identification information in a visual display. A call back function is included to allow for automatic DTMF dialing of a telephone number associated with a previously received call.

15 Claims, 11 Drawing Sheets

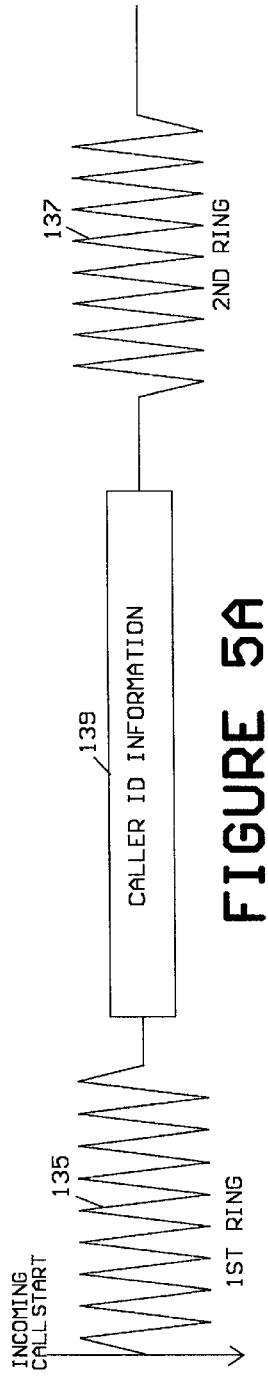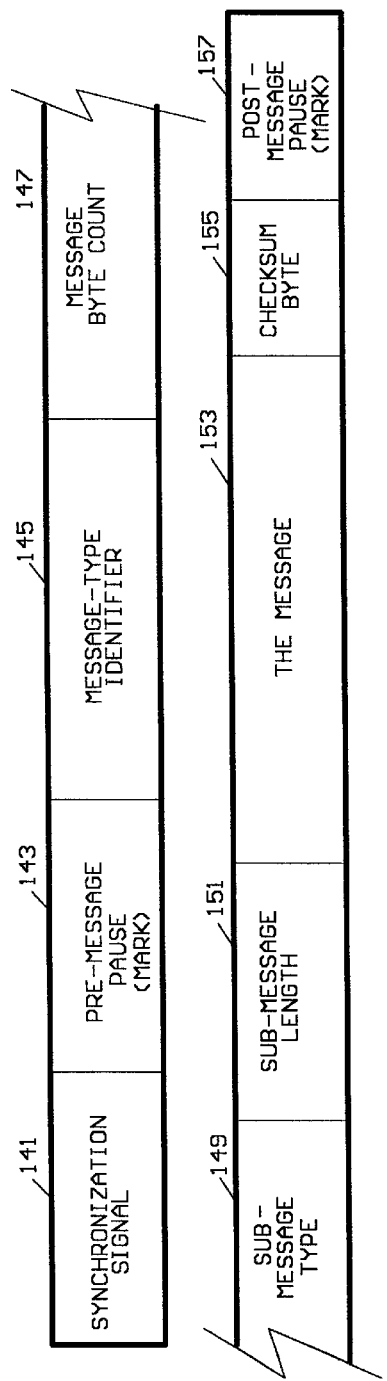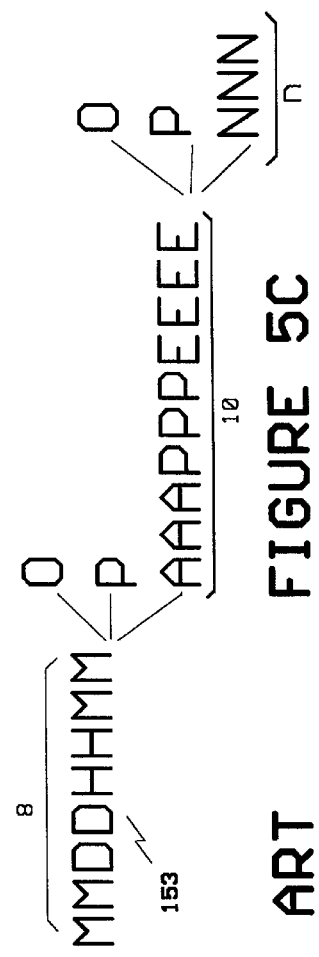

| TOD | DATE | NUMBER | NAME |
|---|---|---|---|
| TIME #1 | DATE #1 | NUMBER #1 | NAME #1 |
| TIME #2 | DATE #2 | NUMBER #2 | NAME #2 |
| ⋮ | ⋮ | ⋮ | ⋮ |
| TIME #N | DATE #N | NUMBER #N | NAME #N |

FIGURE 10

TEXT TELETYPE WRITER WITH CALLER IDENTIFICATION FUNCTION

BACKGROUND OF THE INVENTION

1. Field of the Invention

The present invention relates to telephone devices for the hearing impaired.

2. Description of the Prior Art

There are a variety of prior art devices utilized by the hearing impaired to allow the use of the telephone exchange systems to pass characters between two parties. Essentially, the voice path is used like network wiring to allow a real-time textual dialog as opposed to a voice dialog. These devices are known as text teletype writer (TTY) devices.

TTY devices will typically include an acoustic coupling system which can be physically coupled to a telephone handset, so that a standard telephone microphone and speaker are utilized to pass character strings between a standard telephone and a TTY device.

As a consequence, many of the modern advances in telephony are unavailable to the hearing impaired.

SUMMARY OF THE INVENTION

In the present invention, a text teletype writer (TTY) is equipped with the capability of receiving, processing, and displaying caller identification information. Caller identification information is available in some states from the local telephone service provider. Basically, the caller identification information is a data stream which is passed between the ringing signals through the telephone exchange system. Typically, the caller identification information comprises the name and telephone number of a call-originating party. The TTY telephone equipment of the call-receiving party reads and processes the caller identification data stream very quickly, and displays the name and telephone number of the caller in a display area provided on or with the telephone equipment.

The caller ID signal is passed to the call-recipient between the first ringing signal and the second ringing signal. The ringing signals are typically 120 volt alternating current signals. The caller identification information is typically a much lower amplitude signal with data encoded thereon, typically utilizing frequency shift keying (FSK) which is a well known technique for modulating data on a carrier signal.

The core of the device is a microprocessor which executes programs relating to the TTY function as well as the caller identification function. The microprocessor is electrically coupled to ROM and RAM for accessing program instructions and data. The microprocessor communicates through an 10 Port to an acoustic interface, a keyboard, a printer, and a display. Additionally, the IO port communicates through an interface to the telephone line and receives ringing signals and caller identification information through this interface.

Essentially, the ringing signals and caller identification information are passed through interface and the IO port to the microprocessor. The signals are processed by the microprocessor in order to identify the caller identification information. The microprocessor then passes the caller identification information through the IO port to the display in a manner which announces the name and telephone number of the call-originating party.

BRIEF DESCRIPTION OF THE DRAWINGS

FIGS. 5a 5b and 5c are pictorial and block diagram representations of the transmission of caller identification in accordance with the prior art standards;

FIGS. 9, 10, and 11 depict operation of the present invention to enable the "call back" function.

DETAILED DESCRIPTION OF THE ILLUSTRATIVE EMBODIMENT

Figure 1:
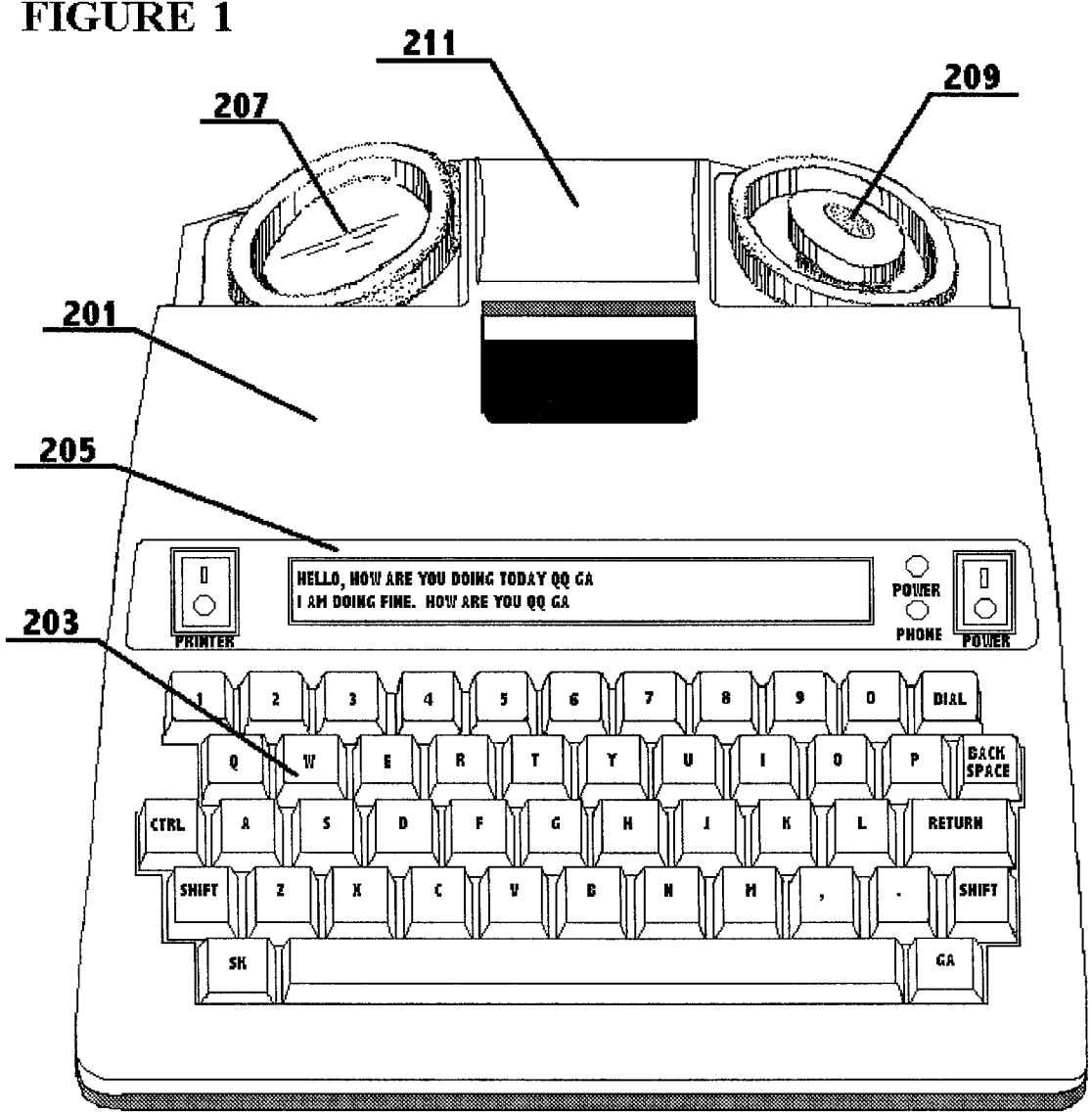
FIG. 1 is a pictorial representation of a TTY device.

FIG. 1 is a pictorial representation of a TTY device 201. As is shown, TTY device 201 includes a keyboard 203 and a display 205. Additionally, acoustic coupling members 207, 209 are provided for acoustically coupling with a telephone handset. Additionally, TTY device 201 is equipped with a tape printer system 211 which allows for printing of the textual messages and/or telephone numbers originating from the TTY device 201 or received by the TTY device 201.

Figure 2:
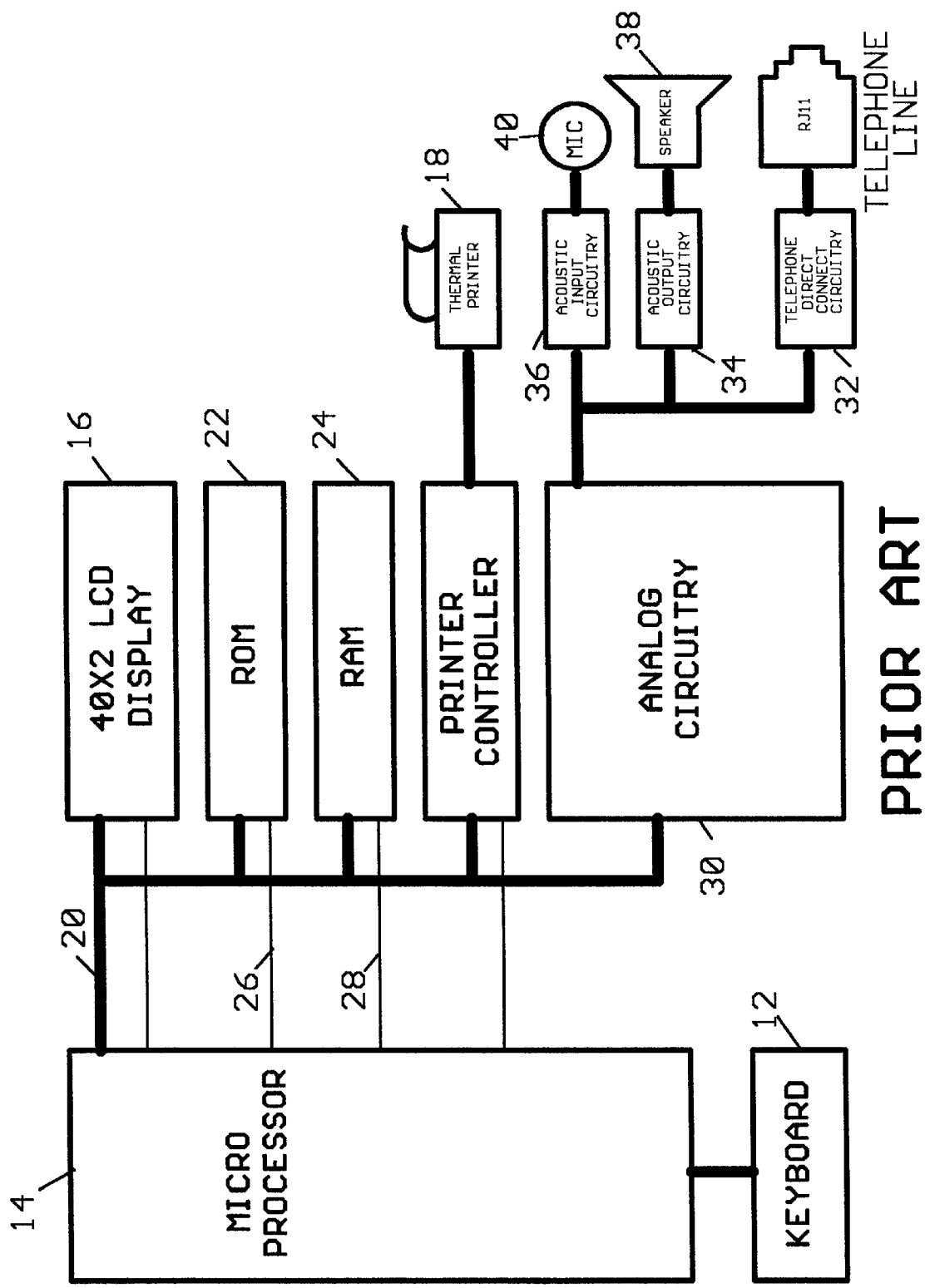
FIG. 2 is a block diagram representation of conventional architecture for TTY devices.

FIG. 2 is a schematic block diagram of the function of a typical TTY. In the TTY of FIG. 2 the user types on a keyboard 12 to input characters into a microprocessor 14. Characters which are received or transmitted by the microprocessor 14 are received or transmitted by the microprocessor 14 and are also displayed to the user on a visual electronic display 16. Characters may also optionally be displayed by means of a hard copy printer 18. Microprocessor 14 is largely responsible for the implementation of the various timing and decoding functions of the TTY. Microprocessor 14 has data and address buses, jointly indicated at 20, which connect to a read-only memory (ROM) 22 and a random access memory (RAM) 24. Appropriate control lines 26 and 28 connect to the ROM 22 and RAM 24 so as to control the operation thereof. ROM 22 is intended to contain the program which dictates the functional operation of microprocessor 14. RAM 24 is utilized as a holding place or stack for data coming into or out of the TTY. In some TTY, the microprocessor, the RAM and the ROM are all combined in a single integrated circuit, while in others they are separate circuits.

As an additional output, microprocessor 14 connects through analog circuitry 30 to one of three separate outputs. The analog circuitry 30 is, most preferably, a modem. One output of the analog circuitry 30 could be a telephone direct connect circuitry 32 which connects the modem directly by hardwiring into the telephone network. A second possible output from the analog circuitry is through an acoustic output 34 intended to audibly connect to the microphone of a telephone handset. An acoustic input circuitry 36 is connected to a microphone, which is intended to audibly couple to the speaker in a telephone handset. The acoustic output speaker and the acoustic input microphone may be connected through a so-called "acoustic coupler" to a conventional telephone handset. In any TTY, either the hardwired connection or the acoustic connection is provided, and sometimes both.

Figure 3:
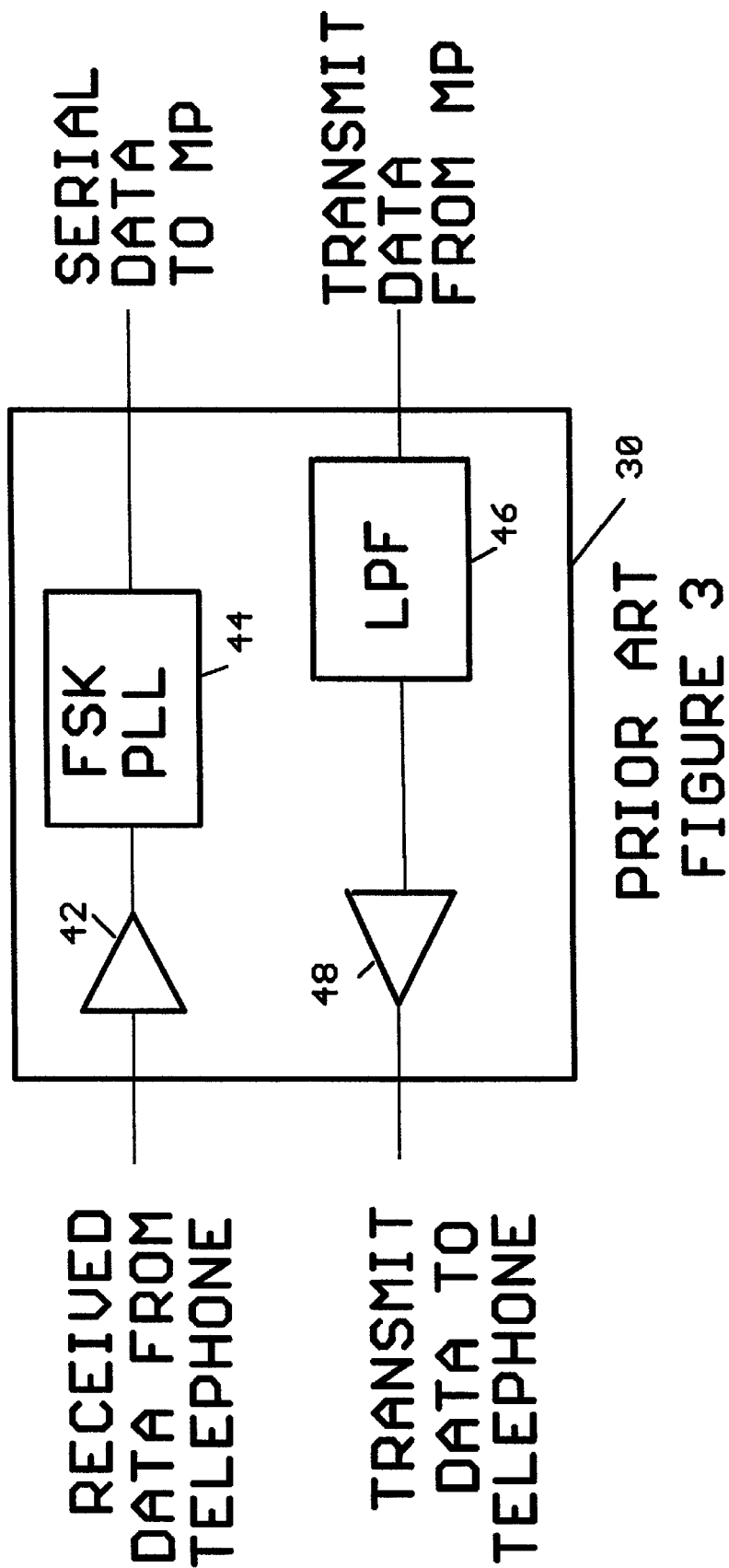
FIG. 3 is a pictorial representation of the conventional dataflow for TTY devices.

Shown in FIG. 3 is a simplified schematic of how one implementation of the input and outputs of the analog circuitry would work. For data coming into the terminal, the audible input from a microphone or telephone is translated into electronic components and then presented to an amplifier 42. The output of the amplifier is presented to two phase locked-loops 44. One of the phase locked-loops 44 is tuned to a frequency of 1800 Hertz, while the other phase locked-loop 44 is tuned to a frequency of 1400 Hertz. 1800 Hertz and 1400 Hertz are the designated carrier frequencies for standard Baudot communication. On the output side of the circuitry, output signals are presented to a LPF (low pass filter) transmit wave shaping circuit 46. The output of that circuitry, consisting of alternate 1400 and 1800 Hertz signals, is presented to an amplifier 48 which is hardwired to the speaker or telephone line.

The present invention allows a conventional TTY device to receive, process, and display caller identification information to allow the hearing impaired user greater flexibility and control over his or her time by allowing him or her to determine the identity of a caller without having to take the telephone call at that time. In order to understand the present invention, the following is a description of the standard caller identification information which is available at this time.

Figure 4:
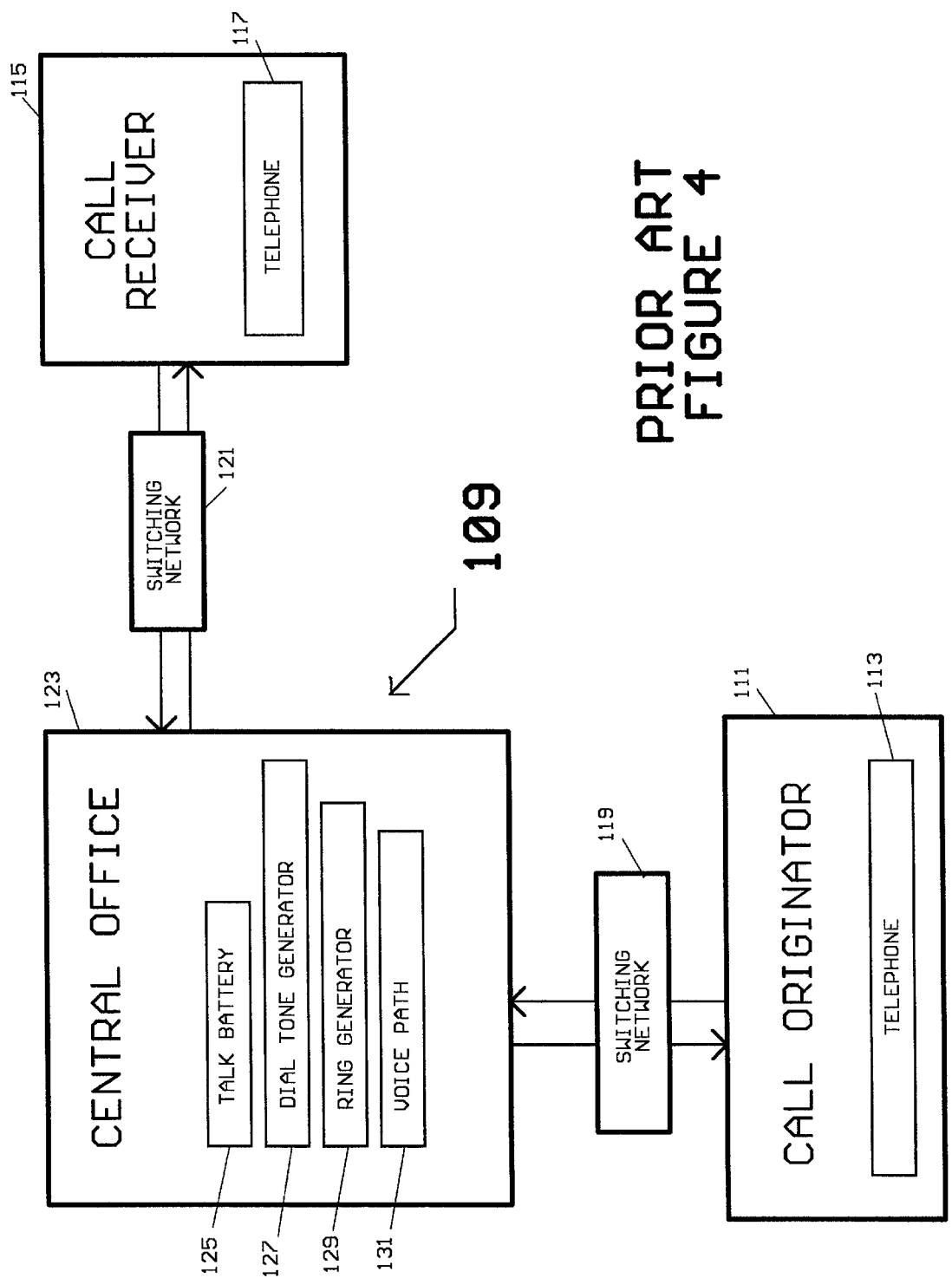
FIG. 4 is a block diagram representation of a telephone network.

FIG. 4 provides a simplified block diagram of a telephone network 109, in accordance with the prior art, which will be utilized to describe some fundamentals of telephony which may be necessary to understand the present invention. As is shown, telephone network 109 can be utilized to allow calloriginator 111 to utilize telephone 113 to place a telephone call to call-receiver 115, which utilizes telephone 117 to receive such a call. Fairly elaborate switching networks 119 and 121 connect call-originator 111 and call-originator 115 to central office 123 of telephone network 109.

In central office 123, there is a source of electrical current, identified as talk battery 125, which is utilized to determine whether or not a particular telephone (i.e., telephone 113 or 115) is in the "on-hook" or "off-hook" condition. If the handset of a particular telephone is lifted from the cradle of the telephone, the telephone goes from an on-hook condition to an off-hook condition. When a particular telephone is in an off-hook condition, dial tone generator 127 at central office 123 of telephone network 109 is utilized to generate an audible dial tone which indicates to the telephone operator that an outgoing call may be initiated. For example, call-originator 111 may lift the handset from the cradle of telephone 113, and receive an audible dial tone through the operation of dial tone generator 127 and central office 123.

After call-originator 111 dials the telephone number of call-receiver 115, ring generator 129 at central office 123 generators a plurality of ring signals which are sent through switching network 121 to telephone 117 to alert callreceiver 115 that a call is incoming. Once call-receiver 115 lifts his or her handset off of the cradle of telephone 117, voice path 131 is established between call-originator 111 and call-receiver 115.

In accordance with current Bell standards, caller-identification information may be transmitted automatically between call-originator 111 and call-receiver 115, through telephone network 109, in a manner which will be described below with reference to FIGS. 5a, 5b and 5c. In the United States of America, in accordance with the Bellcore Specification No. 220, the transmission must occur between the first and second rings. In FIG. 5a, such caller-identification information signals transmitted to call-receiver 115 are depicted in simplified form, with caller-identification information 139 occurring between first ring 135 and second ring 137. The Bellcore Specification requires that caller-identification information 139 occur at least 500 milliseconds after first ring 135 ceases. Thus, the signal which represents the caller-identification information will begin transmission one-half of one second, or longer, after the termination of first ring 135. Caller-identification information 139 is transmitted serially, utilizing a frequency-shift-keying technique, which is well known in the prior art.

The Bellcore Specification also requires that the transmission of calleridentification information 139 end at least 427 milliseconds prior to the commencement of second ring 137. Typically, there is a four second interval between first ring 135 and second ring 137, so a significant amount of time is available for the communication of caller-identification information. Altogether, there is available a period of 2,570 milliseconds for the transmission of caller-identification information, not including pauses required by the Bellcore Specification (such pauses or periods of silence are required at the beginning and end of the message). At 1,200 baud, this message interval is sufficient to transmit 3,084 bits, or 308 bytes.

The blocks of data which make up the caller-identification information 139 is set forth in block diagram form in FIG. 5b. The first component of the caller-identification information is a synchronization signal 141 which comprises a channel seizure signal having a duration of 250 milliseconds of frequencyshift-keying encoding of a bit pattern of alternating zeros and ones. Such a synchronization signal is utilized to provide a recognizable pattern to alert applicable caller-identification decoding equipment that caller-identification information follows. Pre-message pause 143 follows synchronization signals 141, and has a duration of 150 milliseconds, plus or minus 25 milliseconds. The purpose of such a pre-message pause 143 is to condition the receiver for the data which follows.

Next, message-type identifier 145 follows synchronization signals 141. Message type identifier 145 is typically one byte of data which identifies the type of caller-identification message which is being sent. There are two basic types of caller-identification messages, including: (1) only numeric data, which identifies the telephone number for the source of the telephone call; and (2) numeric data, which identifies a telephone number for the source of the telephone call, along with hexadecimal representation of alphabetic characters that contain the directory name associated with the telephone number of the source telephone. In accordance with the Bellcore Standard, 04 hexadecimal identifies a single message caller-identification message, while 80 hexadecimal identifies a caller-identification message which includes both a telephone number and a name.

Next, message byte count 147 provides an indication of the total length of the caller-identification information. This is important because the directory name associated with the source telephone number will have a different length for each particular name.

Thereafter, sub-message type 149 identifies the type of submessage which is transmitted with the caller-identification information. Sub-message link 151 identifies the length of the sub-message which follows.

Message 153 consists of information which is described in more detail below with respect to FIG. 5c. Message 153 is followed by checksum byte 155 which, in accordance with the prior art techniques, provides a checksum total to ensure that data received has not been lost or altered in any way during the transmission. The receiving unit of a caller-identification decoder generates a checksum in response to the entire caller-identification bit stream, and thereafter compares this checksum with checksum byte 155. If these checksums match, then no bits were lost in the transmission; however, if the checksum generated by the caller-identification decoder does not match checksum byte 155 received at the decoder, then one or more data bits may have been lost in the transmission, and the information may be unreliable or unusable.

The final component of a caller-identification message is post-message pause 157, which is a quiescent period prior to second ring 137.

With reference now to FIG. 5c, message 153 will be described in greater detail. The first eight bits of the message include month bits "MM", day bits "DD", hour bits "HH", and minute bits "MM". These eight bits provide the month and date, along with the hour and minute, in military time, of the telephone call. Note that no information is provided regarding the year.

The next portion of message 153 is either (1) a ten digit telephone number, or (2) a single digit which identifies that caller-identification information is either (a) not available, or (b) has been blocked to maintain the caller's privacy.

If caller-identification information is not available, the ASCII character "O" is transmitted. If the caller-identification information has been blocked for reasons of privacy, the character P is transmitted. However, if the calleridentification information is neither unavailable nor blocked, then a ten digit bit stream follows. The first three bits, "AAA", identify the area code; the next three bits, "PPP", identify the prefix, and the final four bits, "EEEE", identify the exchange. For example, if the source phone number is 702-731-1113, then AAA=702, PPP=731, and EEEE=1113.

The next portion of message 153 is caller-identification information which identifies the name associated with the particular preceding telephone number. If this information is unavailable, a single character "O" is provided. If this information is blocked for reasons of privacy, a single character "P" is provided. However, if this information is both available and not blocked, a multi-bit string follows which sets forth a name associated with the particular preceding telephone number (for example, "John Doe").

Therefore, considered broadly, caller-identification information may be solely data which identifies a telephone number associated with the telephone unit utilized to place a call, or the telephone number associated with the telephone unit utilized to place the call in combination with alphabetic characters identifying a name associated with that particular number in a telephone directory (i.e., a telephone director data base). In either event, whether the directory name is provided or not, this information can be considered to be the "caller-identification information." The particular details of the caller-identification standards in the United States of America are set forth in the publications of the Bell Communications Research Laboratories, which are identified as "Bellcore", and include (1) Technical Reference No. TR-TSY-00032, issued Nov. 1, 1986, and entitled "CLASS (sm) Feature: Bulk Calling Line Information"; (2) Technical Reference No. TR-TSY-000030, issued Jan. 1, 1990, entitled "CLASS(sm) Feature: Calling Number Delivery"; and (3) Technical Reference No. TANWT-001188, issued Mar. 1, 1991, entitled "CLASS(sm) Calling Name Delivery and Related Features Generic Requirements"; all of which are incorporated herewith by reference as if fully set forth.

Figure 6:
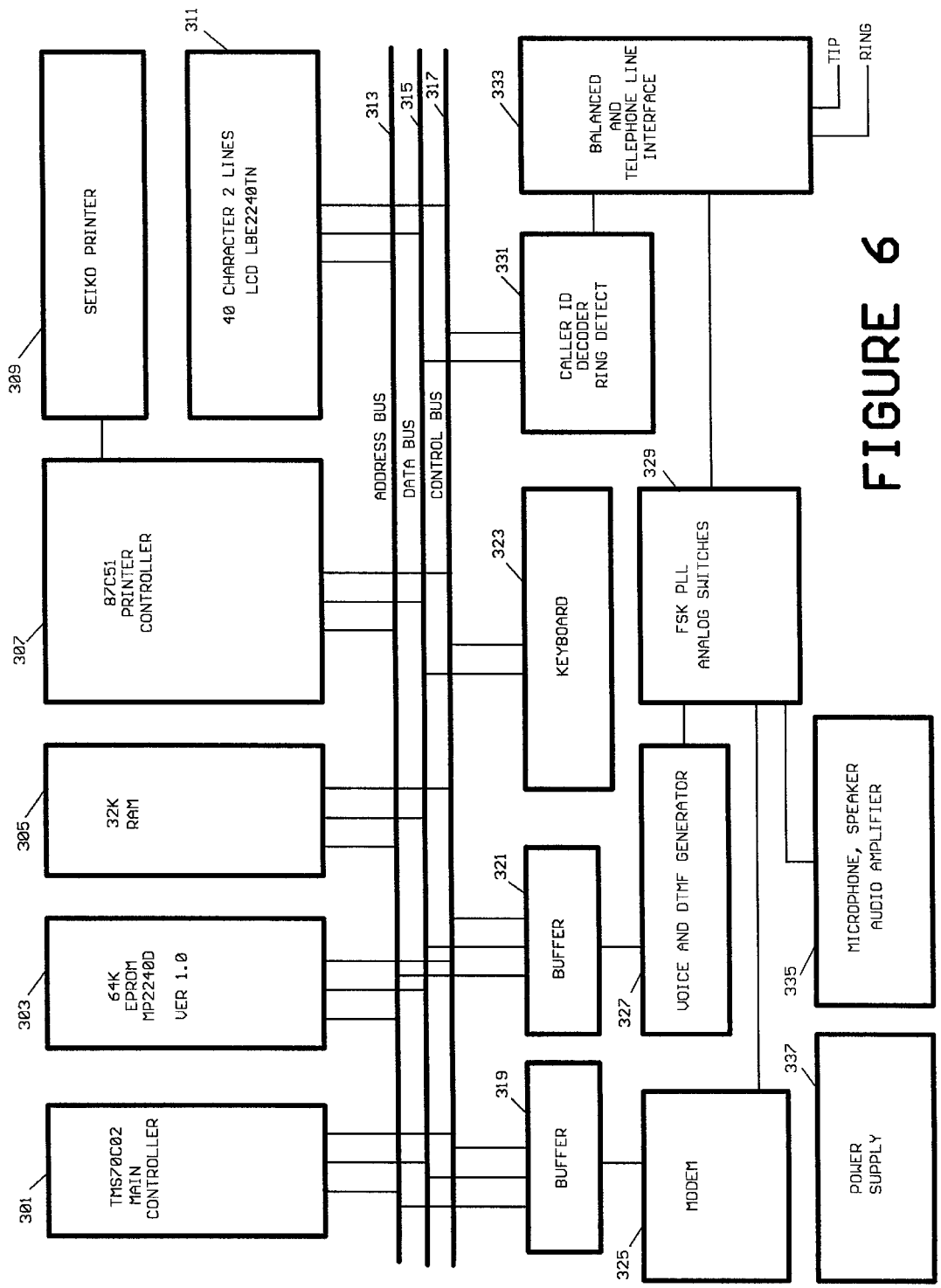
FIG. 6 is a block diagram representation of the improved TTY device of the present invention.

FIG. 6 is a block diagram representation of the implementation of the TTY device with caller identification function of the present invention. As is shown, a microprocessor 301 is provided for processing program instructions, and for handling data, including the caller identification information data. A controller 301 communicates with the other components of the TTY device of the present invention through address bus 313, data bus 315, and control bus 317. A reprogrammable read only memory (ROM) 303 is provided for storing the program instructions. A random access memory (RAM) 305 is provided for storing data, including caller identification information. A printer controller 307 is provided for controlling the operation of printer 309. A liquid crystal display (with 40 characters on two lines) is also provided for displaying textual information, including the caller identification information, in accordance with the present invention.

The improved TTY device of the present invention includes a modem 325 which is connected through buffer 319 to the address bus 313, the data bus 315, and the control bus 317. Keyboard 323 is connected to data bus 315 and control bus 317 and allows the operator to generate textual messages. A voice and DTMF generator 327 is connected through buffer 321 to the address bus 313, data bus 315, and control bus 317. A microphone and audio amplifier section 335 is also provided. The microphone and audio amplifier section 335, the modem 325, and the voice and DTMF generator 327 are coupled to circuitry including a phase log loop and analog switches identified as block 329.

In accordance with the present invention, a telephone line interface 333 is provided in the improved TTY for receiving the TIP signal and the RING signal from the telephone line through a conventional RJ-11 connection, for processing the TIP and RING signals, and for passing the processed TIP and RING signals to the caller identification decoder 331. The caller identification decoder 331 is coupled to data bus 315 and control bus 317. In operation, caller identification decoder 331 passes the decoded caller identification information (preferably in ASCII form) through data bus 315 and control bus 317 to controller 301 where the ASCII characters are further processed and displayed on liquid crystal display 311, and stored in memory at RAM 305.

The operation of the telephone line interface 333 and the caller identification decoder 331 will now be more particularly described with reference to FIG. 7 which is an electrical schematic drawing of the caller identification interface 333 and caller identification decoder 331.

Figure 7:
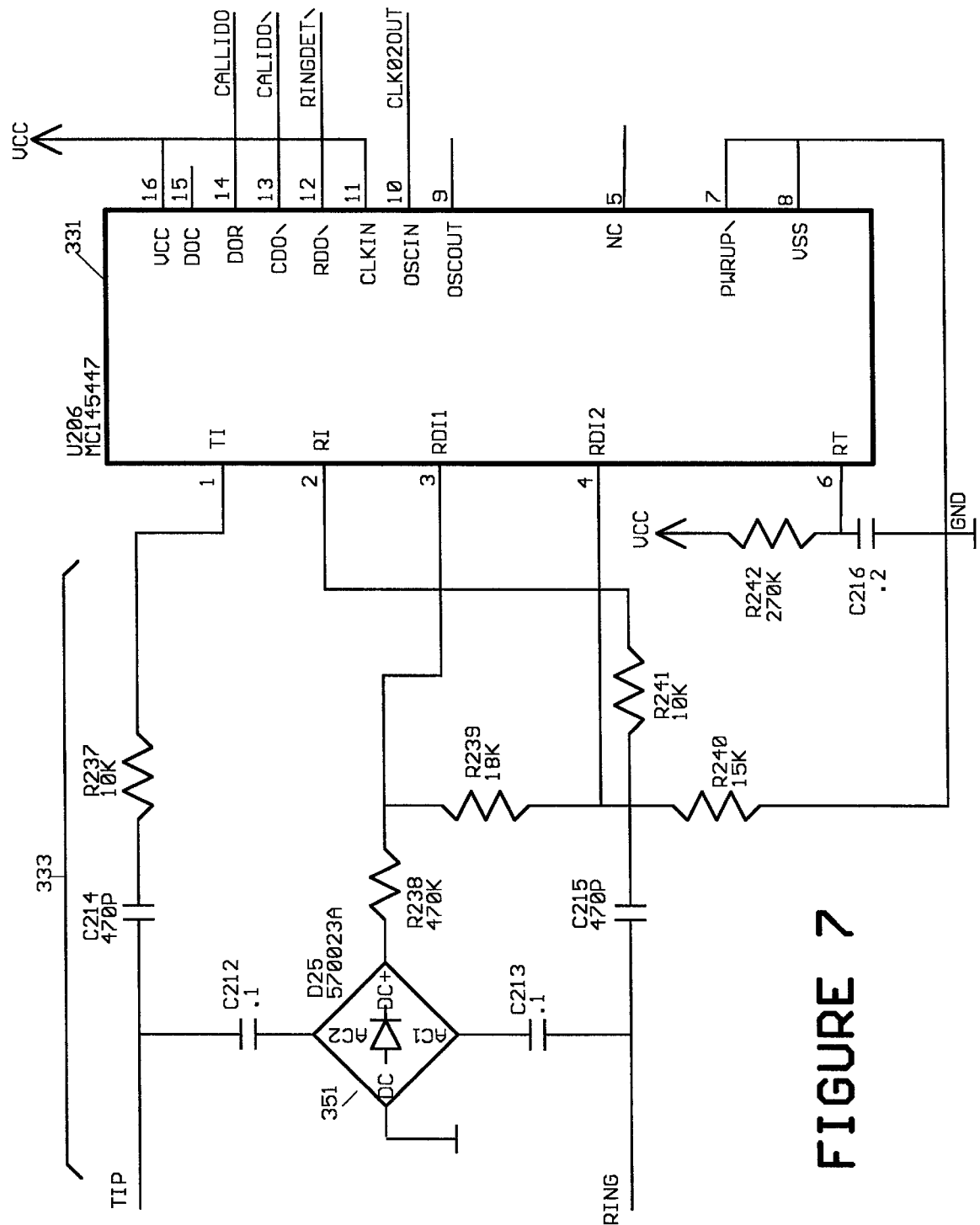
FIG. 7 is a circuit diagram of a caller identification decoder circuit in accordance with the preferred embodiment of the present invention.

FIG. 7 is an electrical schematic depiction of the telephone line interface 333 and caller identification decoder 331 of FIG. 6. The telephone line interface 333 includes a number of circuit components which are utilized to receive and process the TIP and RING signals which are received from the telephone line. In the telephone line interface 333 the isolation capacitors C212, C213, C214, C215 are utilized to block the DC component which is present in the TIP and RING signals. Diode bridge 351 is provided to rectify the alternating current and produce a direct current output. The direct current output of the diode bridge 351 is supplied to pins 3 and 4 of caller identification decoder 331. The amplitude of the signal is reduced through the voltage divider provided by resistors R23, R239, and R240. Likewise, the TIP signal is applied to pin 1 of caller identification decoder 331 through resistor R237 which reduces the amplitude of the TIP signal. Similarly, the RING signal is supplied to pin 2 of caller identification decoder 331 through resistor R241 which likewise reduces the amplitude of the voltage supplied to the caller identification decoder 331.

In operation, when an incoming call is received, the ringing signal RING is supplied to pin 2 of the caller identification decoder 331. The detection of the first ring will initiate action of the caller identification decoder 331. The caller identification information is carried on the TIP signal in accordance with FSK modulation. The signal is rectified by diode bridge 351 and supplied to pins 3 and 4 of caller identification decoder 331. When a ringing signal is detected, output pin 12 (RINGDET) goes low to signal to the controller that a call has been received. Then, caller identification decoder 331 operates to decode the caller identification information. As a result of the decoding, output pin 13 (CALIDCO) goes low to indicate that the carrier signal has been detected. Then, output pin 14 (CALIDO) provides a serial, ASCII character string which is representative of the caller identification information. The microprocessor monitors RINGDET, CALIDCO, and CALIDO via the data buses in order to determine the initiation of a call, the detection of the carrier signal, and the serial ASCII characters which are representation of the caller identification information.

Figure 8:
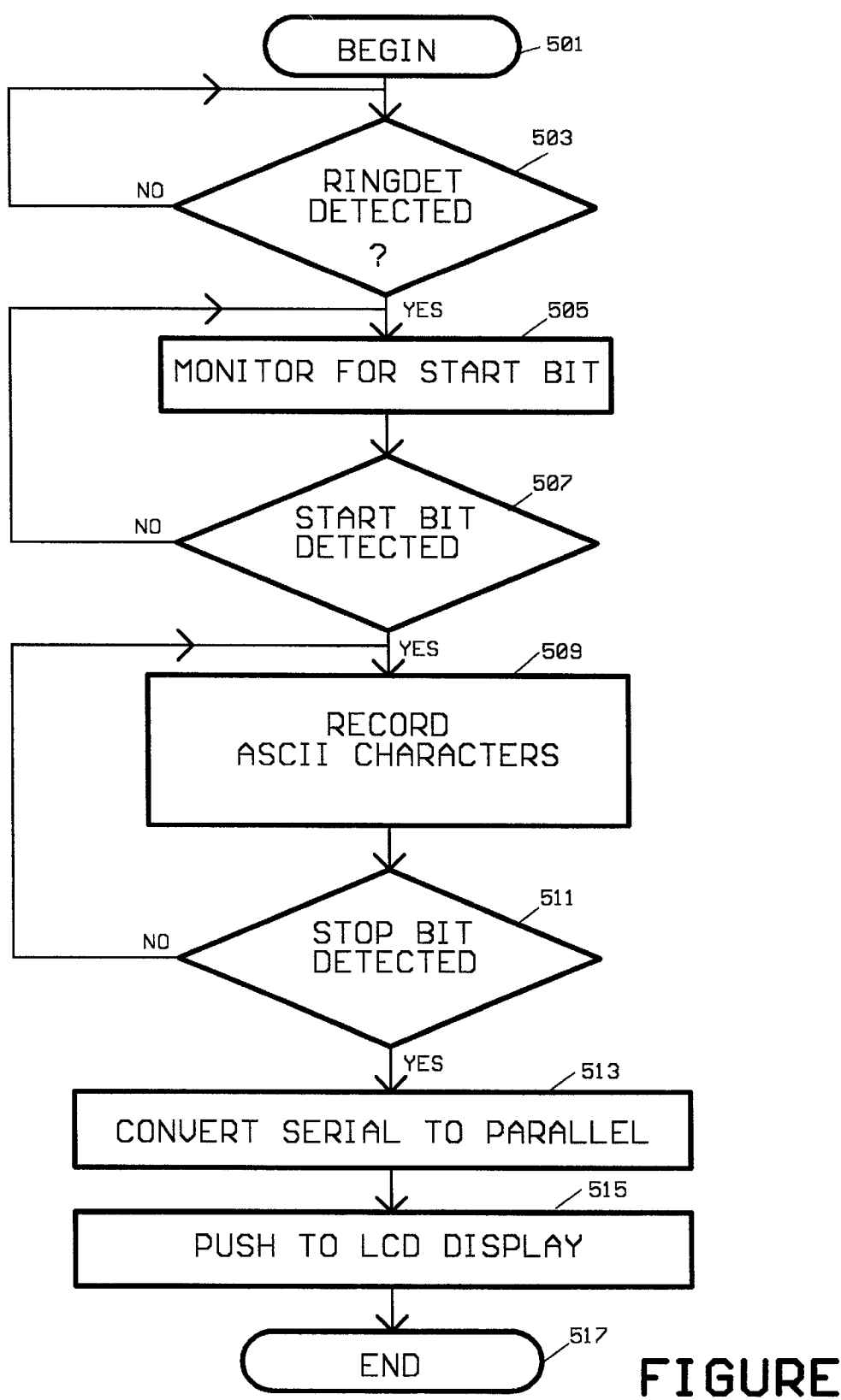
FIG. 8 is a flowchart representation of the operation of the controller in handling caller identification information.

FIG. 8 is a flow chart representation of the operation of controller 301 (of FIG. 6) in processing and displaying the caller identification information. The processing begins at software block 501, and continues at software block 503, wherein controller 301 monitors the data bus to determine whether the RINGDET signal has been detected. Once the RINGDET signal has been detected, control passes to software block 505, wherein controller 301 monitors for the start bit which indicates the commencement of a string of data representative of the caller identification information. Once the start bit is detected, in accordance with software block 507, control passes to software block 509, wherein controller 301 is utilized to record the ASCII characters which are present on the data bus. Next, in accordance with software block 511, controller 301 is utilized to monitor and detect the stop bit. Once the stop bit is detected, control passes to software blocks 513 and 515, wherein controller 301 is utilized to convert the serial ASCII data into parallel data, and push the parallel data to the LCD display on the data bus. The process terminates at software block 517.

The present invention is utilized to provide the caller identification to the user. The present invention will generate a listing of calls which have been previously received but not answered. The operator may return to his or her TTY device and scroll through a listing of the calls which have been received but not answered. The LCD display 311 (of FIG. 6) is utilized to display the area code, phone number, date, and time, and name of the calling party. The present invention is equipped with a "call back" feature which allows the operator to scroll through his or her listing of calls received, and to automatically initiate a call back to the call originating party. This process is depicted in broad overview in flow chart form in FIG. 9. The process begins at software block 519, and continues to software block 521, wherein controller 301 determines whether the call back function has been selected. In the preferred embodiment of the present invention, depression of the "ENTER" key is utilized by the operator to select the "call back" function. Once selection of the call back function is detected, control passes to software block 523, wherein the controller 301 is utilized to examine the content of the display. In accordance with software block 525, controller 301 is utilized to locate the phone number field in the display. Next, in accordance with software block 527, controller 301 is utilized to determine whether the call is a local or long distance call. If the call is a long distance call, control passes to software block 529, wherein controller 301 is utilized to set up for long distance dialing.

This set up would require the entry of the appropriate prefix and area code which would allow for long distance calls. Next, in accordance with software block 531, controller 301 is utilized to actuate a DTMF generator located within the TTY device which initiates the DTMF tones which dial the number selected through the "call back" function. Finally, the process ends at software block 533.

The "call back" function is very advantageous for the hearing impaired since it allows the use of the caller identification information which is transmitted through the telephone system to be recorded, preserved, and reviewed in order to serve a function similar to that of a telephone answering machine (TAD) which is a common function provided in many consumer products for persons which are not hearing impaired. Of course, a hearing impaired person may find a TAD of little or no utility. Consequently, the ability of the present invention to record in memory a plurality of previously received, but not answered, calls allows the hearing impaired individual to obtain some of the advantages available in commercial products which are presently enjoyed by the non hearing impaired individuals through use of the recordation of voices.

The "call back" function also presents another advantage which is useful for both the hearing impaired and those that are not hearing impaired. The call back function can be utilized to record all calls received until a predetermined amount of memory is utilized. Preferably, the TTY present invention utilizes a stack memory which pushes the new call to the top of the stack while deleting old calls from the bottom of the stack. The size of the memory may determine the total number of calls which are recorded. The memory stack associated with the "call back" function can be utilized to allow one to provide a business record of daily or hourly activities. In accordance with the present invention, this data may be reviewed in the LCD display, or printed on the paper tape utilizing the dedicated printer of the TTY device.

Figure 9:
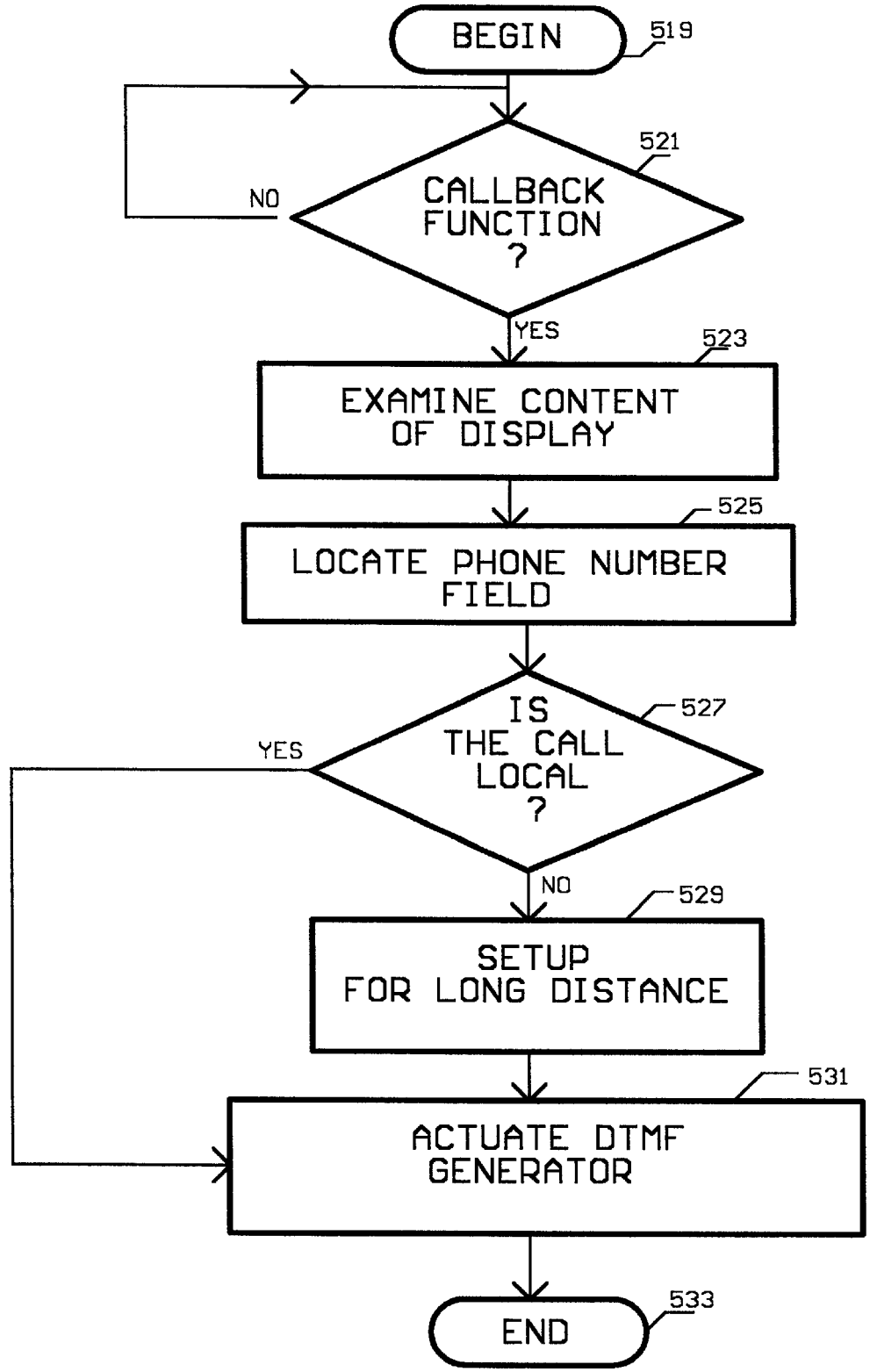
Figure 11:
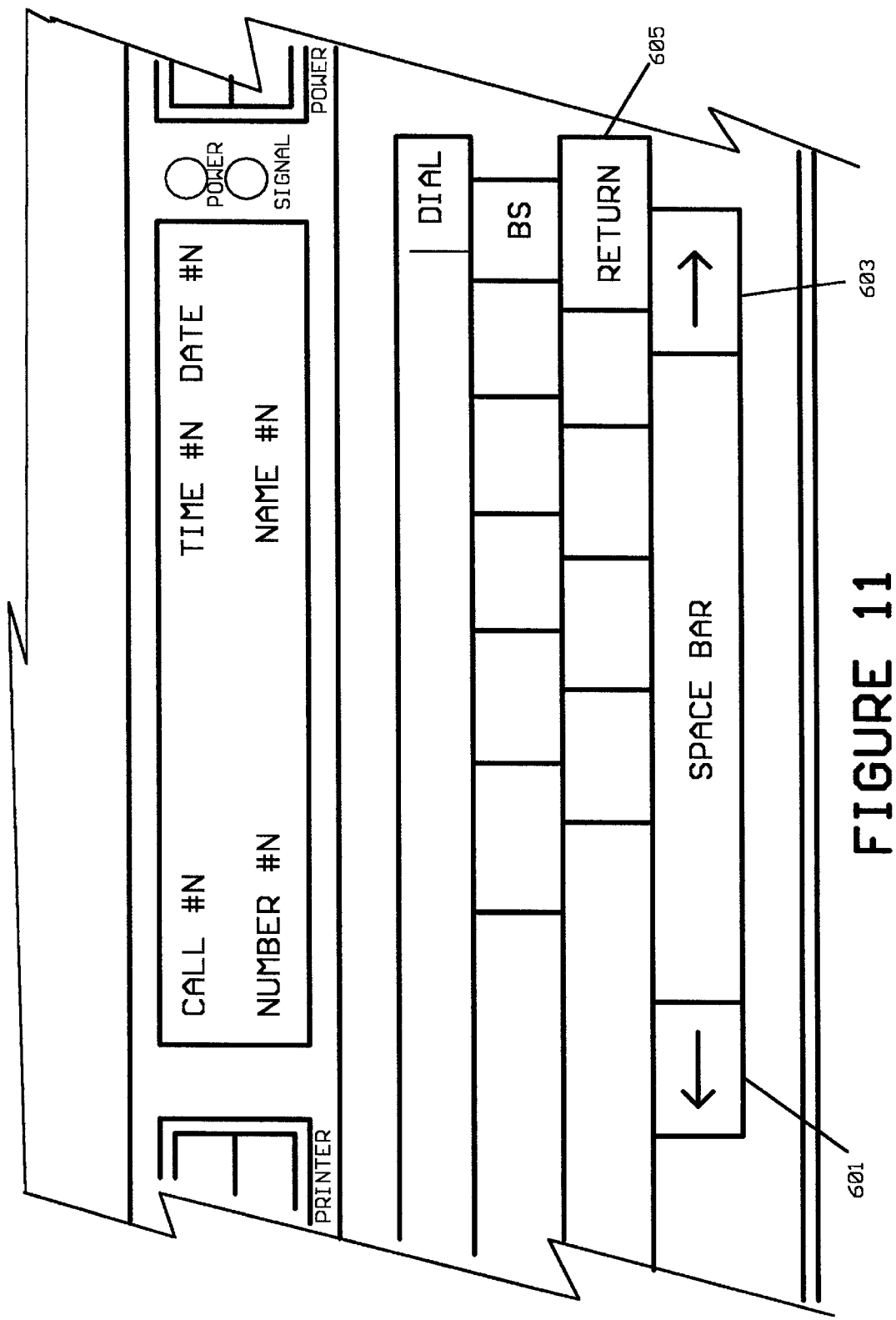

FIGS. 10 and 11 will now be utilized to further describe the "call back" function which is depictive in flow chart form in FIG. 9. As shown in FIG. 10, a database is provided which includes a number of fields for recordation of information relating to calls received by the telecommunication device. The following fields are provided: a time of day (TOD) field, a date field, a number field, and a name field. Caller identification information from calls received by the TTY device are recorded. The information can be reviewed by the operator, as is now described with reference to FIG. 11. The content of the database may be scrolled utilizing dedicated function keys, such as the uparrow key 601 and the down-arrow key 603. The particular telephone number to be utilized in the call back function may be selected by depression of a dedicated key, such as the "Enter" key 605. This will cause the microprocessor to locate the telephone number, determine whether it is a local or long distance call, and initiate actuation of the DTMF actuator carried within the TTY device in order to initiate telephone communication.

What is claimed is:

1. A telecommunication device for the hearing impaired for connection to a telephone network for receipt of incoming calls from a call-originator, and for placement of outgoing calls, comprising:

a. a keyboard for entering outgoing messages;

b. an acoustic coupling member for acoustically coupling with a telephone handset;

c. a signal generator for generating communication tones through said acoustic coupling member corresponding to outgoing messages;

d. a signal receiver for receiving tones through said acoustic coupling member corresponding to incoming messages;
e. a visual display for displaying said incoming and outgoing messages;
f. a microprocessor operating in accordance with program instructions for:
   1. receiving input from said keyboard;
   2. controlling operation of said signal generator;
   3. receiving incoming messages from said signal receiver; and
   4. displaying incoming and outgoing messages;
g. a line coupling member for electrically coupling said telecommunication device to a telephone line and for receiving a TIP signal and a RING signal;
h. a telephone line interface for signal processing of said TIP and RING signals;
i. a caller identification decoder for:
   1. receiving processed TIP and RING signals from said telephone line interface;
   2. detecting at least one RING signal;
   3. receiving automatically coded caller identification signals from said telephone network between particular ring signals;
   4. decoding from said coded caller identification signal at least one of (1) a telephone number associated with telephone service of said call-originator, and (2) identifying information associated with telephone service of said call originator; and
   5. passing decoded caller identification information to said microprocessor; and
j. wherein said decoded caller identification information is processed by said microprocessor and displayed on said visual display.

2. A telephone communication device according to claim 1 wherein said communication tones comprise Baudot tones.

3. A telephone communication device according to claim 1 wherein said telephone line interface processes said TIP and RING signals by eliminating dc components and rectifying said TIP and RING signals.

4. A telephone communication device according to claim 1 wherein said caller identification decoder commences decoding operation after detection of a first RING signal.

5. A telephone communication device according to claim 1 wherein:
   said caller identification decoder passes said caller identification information to said microprocessor in serial ASCII format; and
   said microprocessor converts said serial ASCII format to a parallel ASCII format for use by said visual display.

6. A telephone communication device according to claim 1, further comprising:
   k. a DTMF generator;
   l. a "call back" computer instruction module for activating said DTMF generator to initiate telephone communication with a communicant identified by said caller identification information displayed in said visual display.

7. A telecommunication device according to claim 6, further comprising:
   m. a database for recording caller identification information associated with incoming calls; and
   n. means for selecting items in said database for use by said call back computer instruction module.

8. A telecommunication device for the hearing impaired for connection to a telephone network for receipt of incoming calls from a call-originator, and for placement of outgoing calls, comprising:
a. a keyboard for entering textual messages;
b. an acoustic coupling member for acoustically coupling with a telephone handset;
c. a signal generator for generating at least one of (1) ASCII characters, and (2) Baudot tones through said acoustic coupling member;
d. a signal receiver for receiving at least of (1) ASCII characters and (2) Baudot tones through said acoustic coupling;
e. a visual display for displaying incoming and outgoing messages;
f. a microprocessor operating in accordance with program instructions for:
   1. receiving input from said keyboard;
   2. controlling operation of said signal generator;
   3. receiving incoming messages from said signal receiver; and
   4. displaying incoming and outgoing messages;
g. a line coupling member for electrically coupling said telecommunication device to a telephone line and for receiving a TIP signal and a RING signal;
h. a telephone line interface for signal processing of said TIP and RING signals;
i. a caller identification decoder for:
   1. receiving processed TIP and RING signals from said telephone line interface;
   2. detecting a first RING signal;
   3. receiving automatically coded caller identification signals after said first RING signal from said telephone network between particular ring signals;
   4. decoding said from coded caller identification signal at least one of (1) a telephone number associated with telephone service of said call-originator, and (2) identifying information associated with telephone service of said call originator; and
   5. passing decoded caller identification information to said microprocessor; and
j. wherein said decoded caller identification information is processed by said microprocessor and displayed on said visual display.

9. A telephone communication device according to claim 8 wherein:
   said caller identification decoder passes said coder caller identification information to said microprocessor in serial ASCII format; and
   said microprocessor converts said serial ASCII format to a parallel ASCII format for use by said visual display.

10. A telephone communication device according to claim 8, further comprising:
   k. a DTMF generator;
   l. a "call back" computer instruction module for activating said DTMF generator to initiate telephone communication with a communicant identified by said caller identification information in said visual display.

11. A telecommunication device according to claim 10, further comprising:
   m. a database for recording caller identification information associated wtih incoming calls; and
   n. means for selecting items in said database for use by said call back computer instruction module.

12. A telecommunication device for the deaf comprising for connection to a telephone network for receipt of incoming calls from a call-originator, and for placement of outgoing calls:

a. a keyboard;

b. a visually readable display;

c. a microprocessor operating in accordance with a program code and connected to accept input data characters from the keyboard and to present data characters on the display;

d. an analog input circuit adapted to being connected to a telephone line so as to be responsive to the reception of Baudot tones over the telephone line and also connected to the microprocessor so as to provide a digital input to the microprocessor of the data received over the telephone line;

e. an analog output line adapted to being connected to the telephone line so as to be capable of presenting Baudot tones over the telephone line and also connected to receive data from the microprocessor and transmit Baudot tones encoding such data over the telephone line; and f. a line coupling member for electrically coupling said telecommunication device to a telephone line and for receiving a TIP signal and a RING signal;

g. a telephone line interface for interface for signal processing of said TIP and RING signals;

h. a caller identification decoder for:
 1. receiving processed TIP and RING signals from said telephone line interface;
 2. detecting a first RING signal;
 3. receiving automatically coded caller identification signals after said first RING signal from said telephone network between particular ring signals;
 4. decoding from said coded caller identification signal at least one of (1) a telephone number associated with telephone service of said call-originator, and (2) identifying information associated with telephone service of said call originator; and
 5. passing decoded caller identification information to said miniprocessor.

i. a memory device connected to the microprocessor containing the program code for operation of the microprocessor to control operation of the telecommunications device to generally (i) receive data entered from the keyboard, (ii) present entered data from the keyboard on the analog output line; (iii) receive input data from the analog input line; (iv) display data from both the keyboard and the input analog line on the display; and (v) display decoded caller identification information.

13. A telephone communication device according to claim 12 wherein:

said caller identification decoder passes said coder identification information to said microprocessor in serial ASCII format; and said microprocessor converts said serial ASCII format to a parallel ASCII format for use by said visual display.

14. A telephone communication device according to claim 12, further comprising:

j. a DTMF generator;

k. a "call back" computer instruction module for activating said DTMF generator to initiate telephone communication with a communicant identified by caller identification displayed in said visual display.

15. A telecommunication device according to claim 14, further comprising:

l. a database for recording caller identification information association with incoming calls; and m. means for selecting items in said database for use by said call back computer instruction module.

* * * * *